Patented Oct. 20, 1925.

1,558,185

UNITED STATES PATENT OFFICE.

NORMAN W. KRASE, OF CLARENDON, VIRGINIA, AND VERNIE LESESSNE GADDY, OF DILLON, SOUTH CAROLINA, ASSIGNORS TO RICHARD C. TOLMAN, TRUSTEE.

MANUFACTURE OF UREA FROM AMMONIUM CARBAMATE.

No Drawing. Application filed March 25, 1921. Serial No. 455,496.

*To all whom it may concern:*

Be it known that we, NORMAN W. KRASE and VERNIE LESESSNE GADDY, citizens of the United States, and residents, respectively, of Clarendon, county of Arlington, and State of Virginia, and Dillon, county of Dillon, and State of South Carolina, have invented an Improvement in the Manufacture of Urea from Ammonium Carbamate, of which the following is a specification.

This invention relates to the manufacture of chemical compounds from solid condensates and has more especial reference to the manufacture of urea from ammonium carbamate.

The usual processes for producing urea from ammonium carbamate or for producing other compounds from solid condensates by heating the constitutents of such compounds in an autoclave involve the preparation of ammonium carbamate or other solid condensate directly in the autoclave in which the conversion by means of heating is subsequently carried out.

This method or procedure necessitates the alternate heating and cooling of the autoclave, since the condensate is prepared therein, and, the process, furthermore, is attended by various other difficulties. For example, in the case of the production of urea from ammonium carbamate, one process requires the use of liquid ammonia, another makes necessary the slow condensation of gaseous ammonium carbamate in the autoclave.

This invention is an improvement in the method of preparing the charge of ammonium carbamate or ammonium carbamate mixed with ammonium carbonate, or any other solid condensate, such as, for instance, ammonium bicarbonate or ammonium carbonate, prepared from condensible gases or fluids for treatment in an autoclave and in the method of the introduction of this prepared charge into the autoclave.

The invention may be carried out substantially as follows, although the operation may be varied in detail without departing from the spirit of the invention or the scope of the claims.

The charge prepared in any suitable condenser, is placed in a press or briquetting apparatus and subjected to pressure sufficient to produce a briquette or block of suitable strength for handling. We prefer to use such a pressure that the resulting briquettes, in the case of the charge for urea manufacture, will have a density of approximately 1.1 grams per cubic centimeter; however, any other suitable pressure may be used.

The briquetting or forming apparatus may conveniently be of such dimensions that the resulting briquette, when placed in the autoclave for conversion into urea, exactly fills the autoclave. If the autoclave is of such a length that the briquette can not be conveniently produced or handled, the autoclave charge may be made up of several shorter briquettes which may be loaded successively into the autoclave.

It should be especially noted, as one of the novel features of this method of manufacture, that there is no necessity for alternate heating and cooling of the autoclave as is necessary when the charge is formed directly therein, since the briquettes can be quickly dropped into the autoclave.

Having thus described our invention, what we claim as new and desire to procure by Letters Patent, is:—

1. The process of making urea from a mixture of ammonium carbamate and ammonium carbonate, comprising compressing the mixture, charging the compressed mixture into a heated autoclave and maintaining the heat of the autoclave.

2. The process of making urea from ammonium carbamate, comprising compressing the ammonium carbamate, charging the ammonium carbamate into a heated autoclave and then heating the autoclave.

NORMAN W. KRASE.
VERNIE LESESSNE GADDY.